122,471

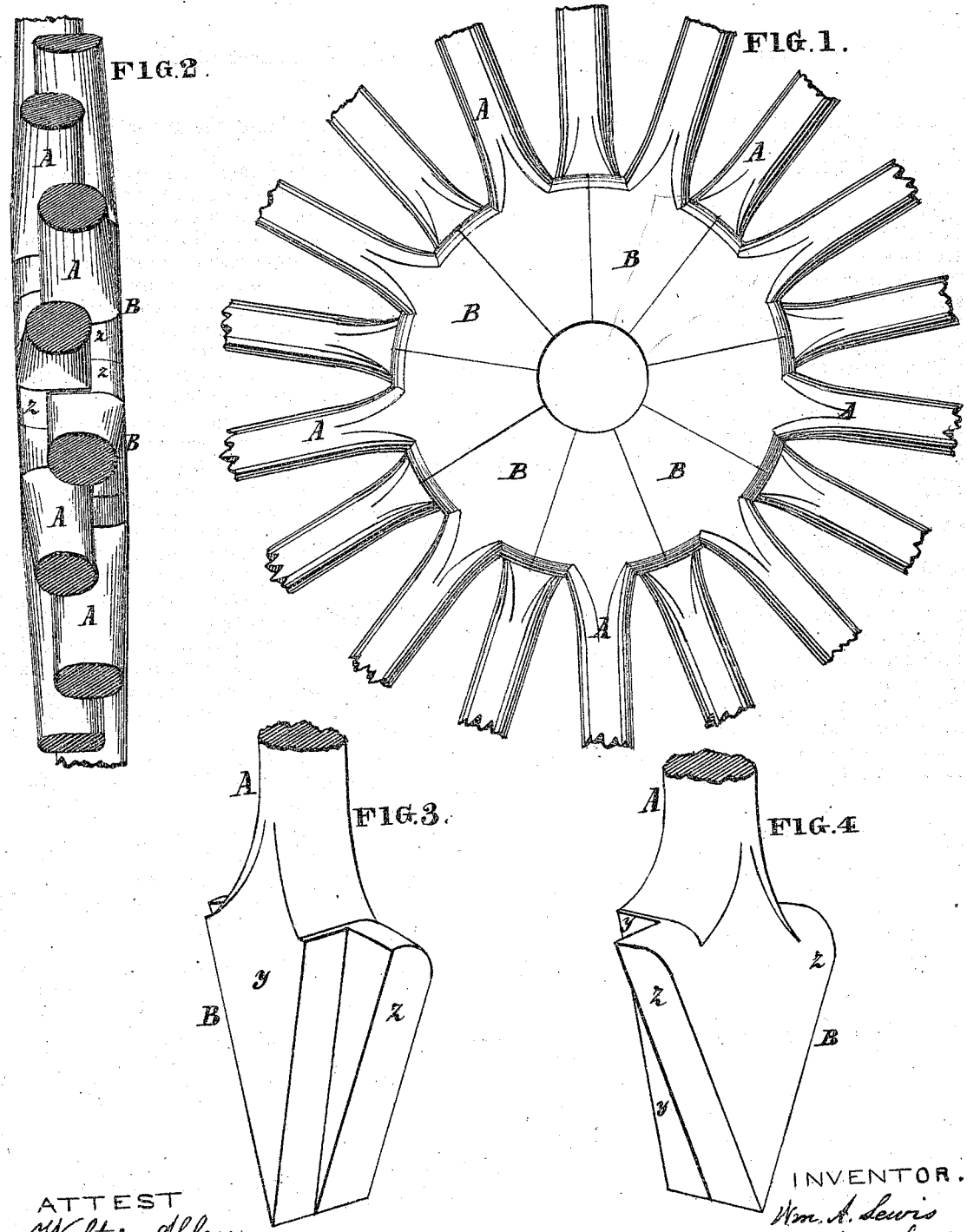

UNITED STATES PATENT OFFICE.

WILLIAM ARNOLD LEWIS, OF CHICAGO, ILLINOIS.

IMPROVEMENT IN SPOKES AND WHEELS FOR VEHICLES.

Specification forming part of Letters Patent No. 122,471, dated January 2, 1872.

Specification describing an Improvement in Carriage-Wheels, invented by WILLIAM ARNOLD LEWIS, of Chicago, in the county of Cook, Illinois.

This improvement relates to a strong double-faced carriage-wheel to be composed of wooden spokes, a metallic hub, and a rim of any preferred construction. The invention consists in the shape of the spokes, which is such that when united they form of themselves a solid central section of the hub, and are dodged or "staggered" and made to mutually support each other.

Figure 1 is a face view of a set of my improved spokes. Fig. 2 is a sectional edge view of the same. Figs. 3 and 4 are different perspective views of a single spoke.

My improved spokes may be made of any suitable wood, and by hand or machinery. The body A of each spoke may also be of any preferred shape, and its upper end be tenoned or otherwise adapted for attachment to the rim. To dodge or stagger the spokes, and at the same time unite them, and combine them with the hub in the most effective way, I form on the inner end of each an extension, B, of length equal to desired radius of hub, and of the same thickness as the body A. These are made of sector-shape and of two widths, the outer half $z$ representing the space of two spokes in the hub, and the inner half $y$ the space of one spoke.

The spokes thus formed are assembled, as shown in Figs. 1 and 2, with opposite sides of the alternate spokes to the respective faces.

The inner sections $y$ are thus made to intermesh, while the outer sections $z$ form the outer faces of the hub section formed by the congregated spokes. The spokes thus arranged are secured in the metallic hub and the rim applied in any suitable manner.

I am aware that the spokes of single-web carriage-wheels have been made to form sections of the hubs of the same, and that dodged or staggered spokes have been secured in metallic and wooden hubs in various ways.

What I claim in this my invention is—

1. The improved spokes for double-faced carriage-wheels, herein shown and described, having the inner and outer hub-sections $z\ y$ formed thereon, as a new article of manufacture.

2. A double-faced carriage-wheel composed in part of spokes forming a solid central section of the hub, the spokes being constructed with inner and outer hub-sections $z\ y$, and combined and arranged as herein set forth.

WM. A. LEWIS.

Witnesses:
D. S. FASSETT,
J. R. COMPTON.

(31)